E. L. BROWN & M. MURPHY.
FIRELESS COOK STOVE OR COOKER.
APPLICATION FILED JULY 26, 1913.
1,110,184.
Patented Sept. 8, 1914.
4 SHEETS—SHEET 1.
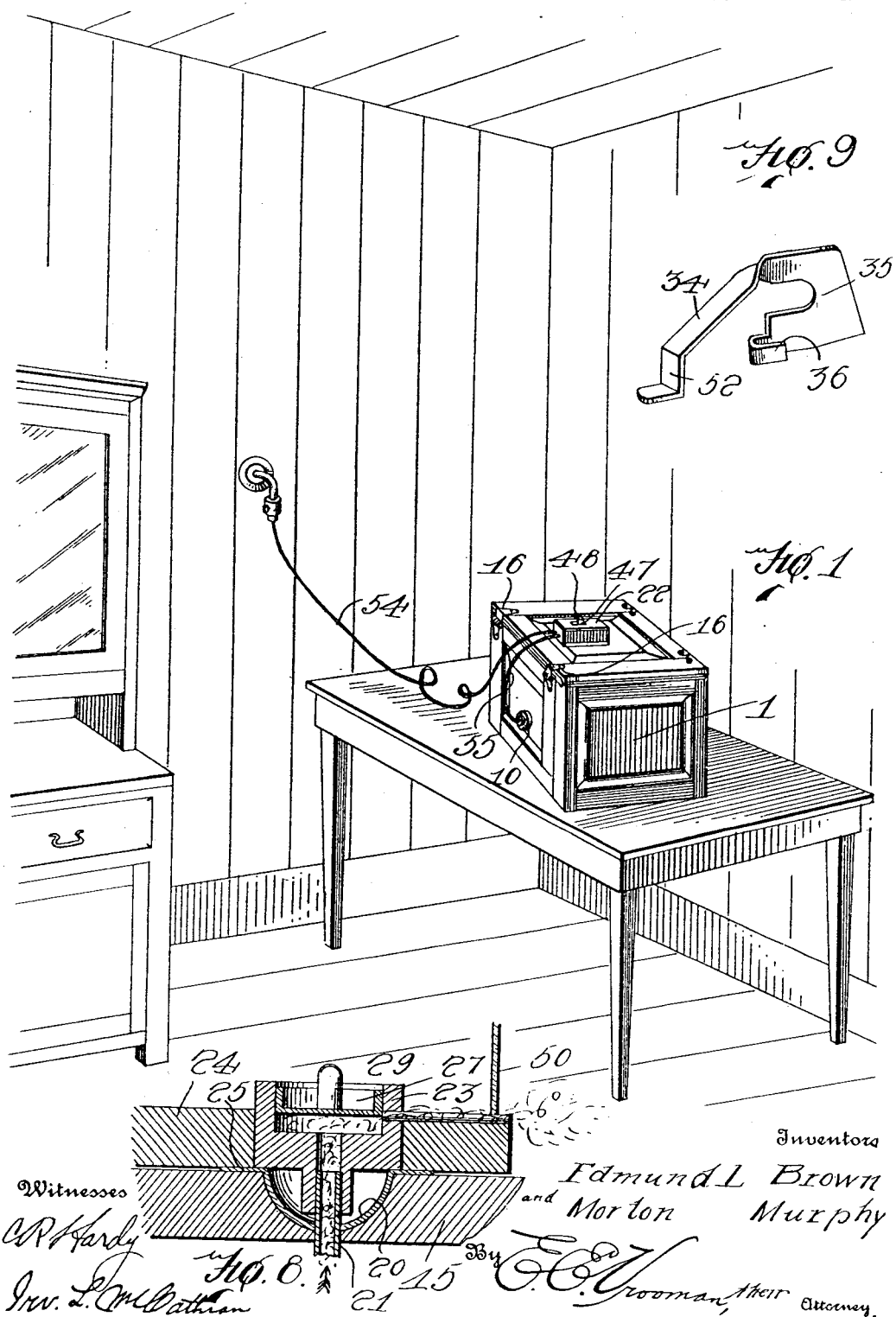
Witnesses
Inventors
Edmund L Brown
and Morton Murphy
By their Attorney

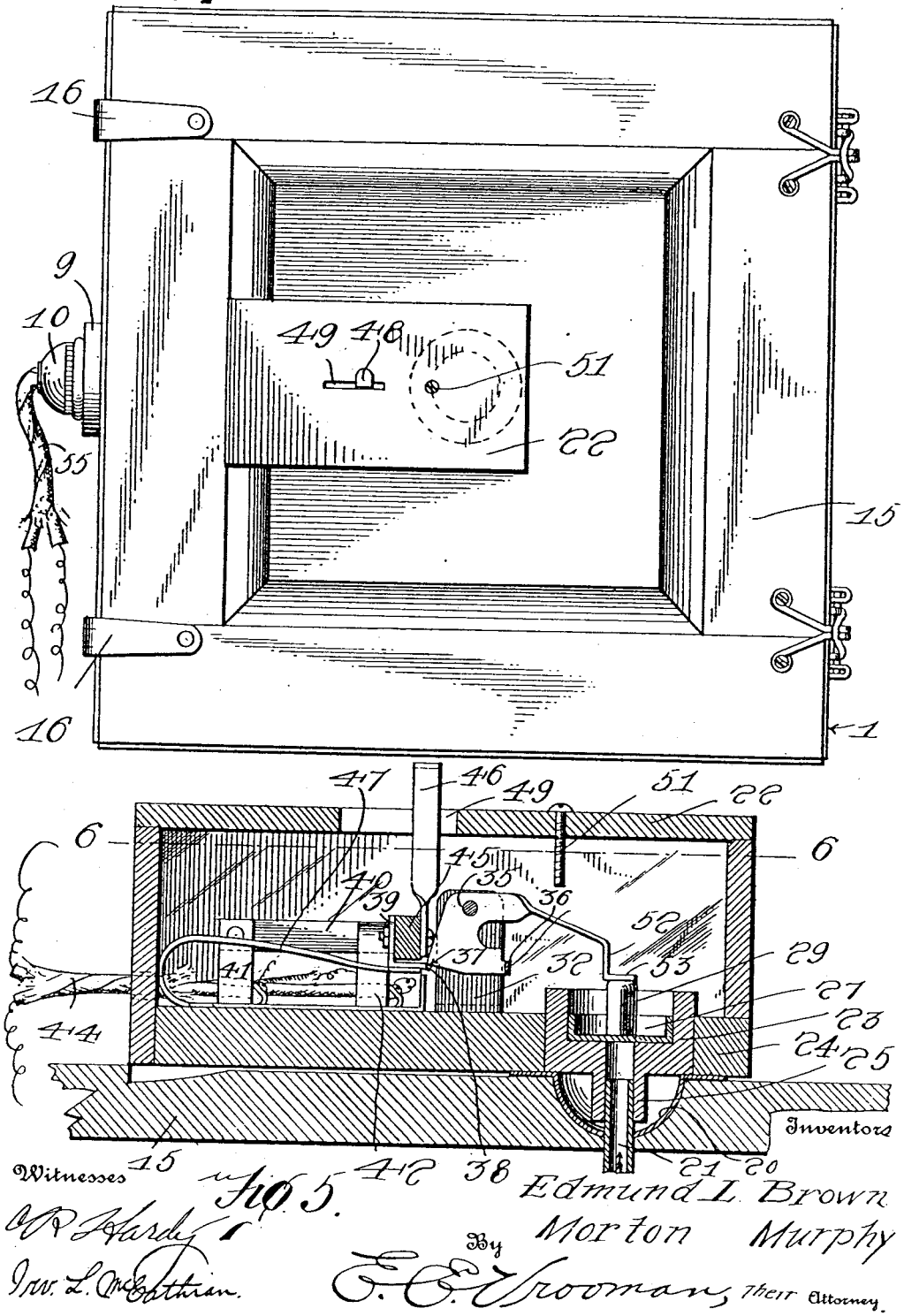

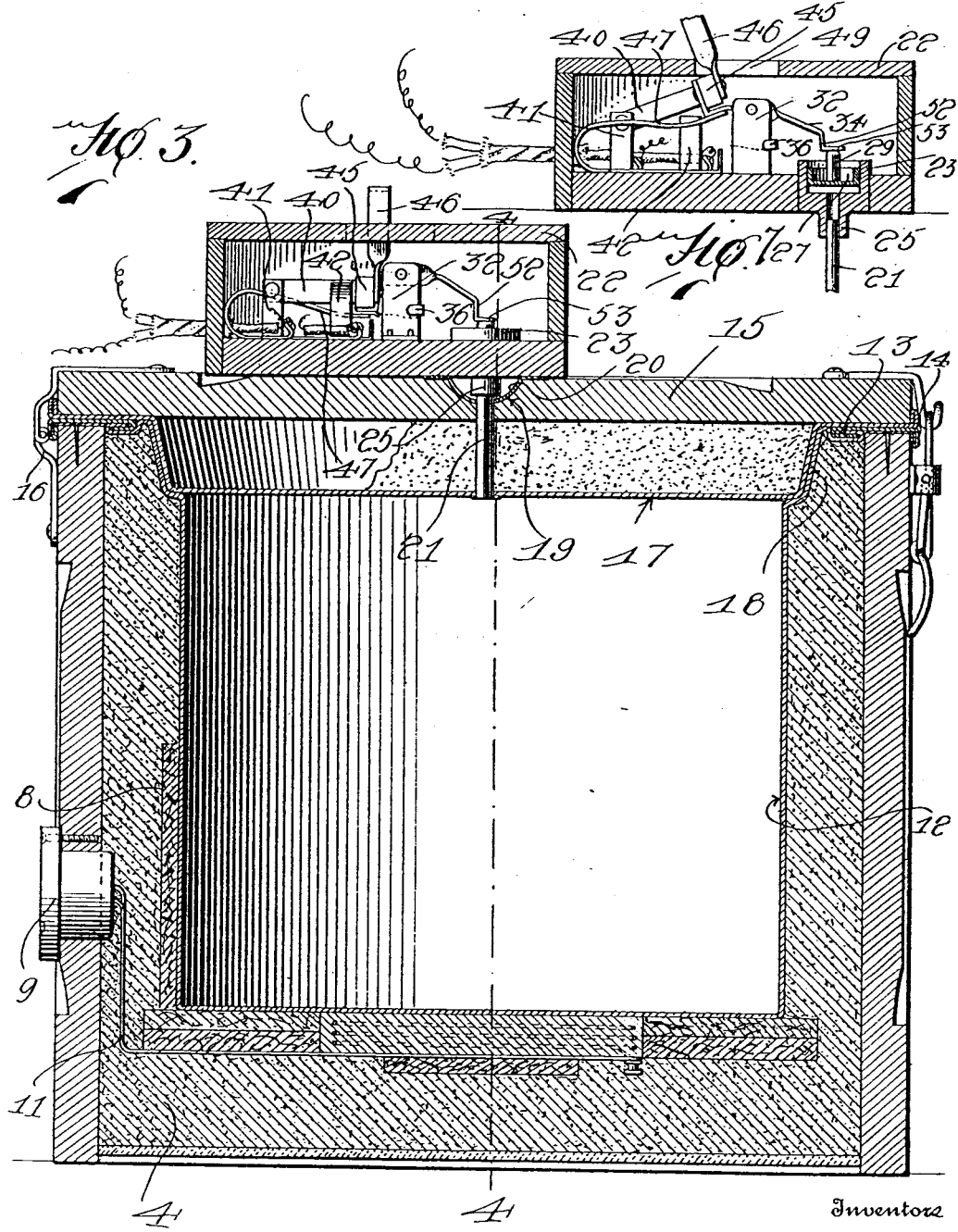

E. L. BROWN & M. MURPHY.
FIRELESS COOK STOVE OR COOKER.
APPLICATION FILED JULY 26, 1913.
1,110,184.
Patented Sept. 8, 1914.
4 SHEETS—SHEET 4.
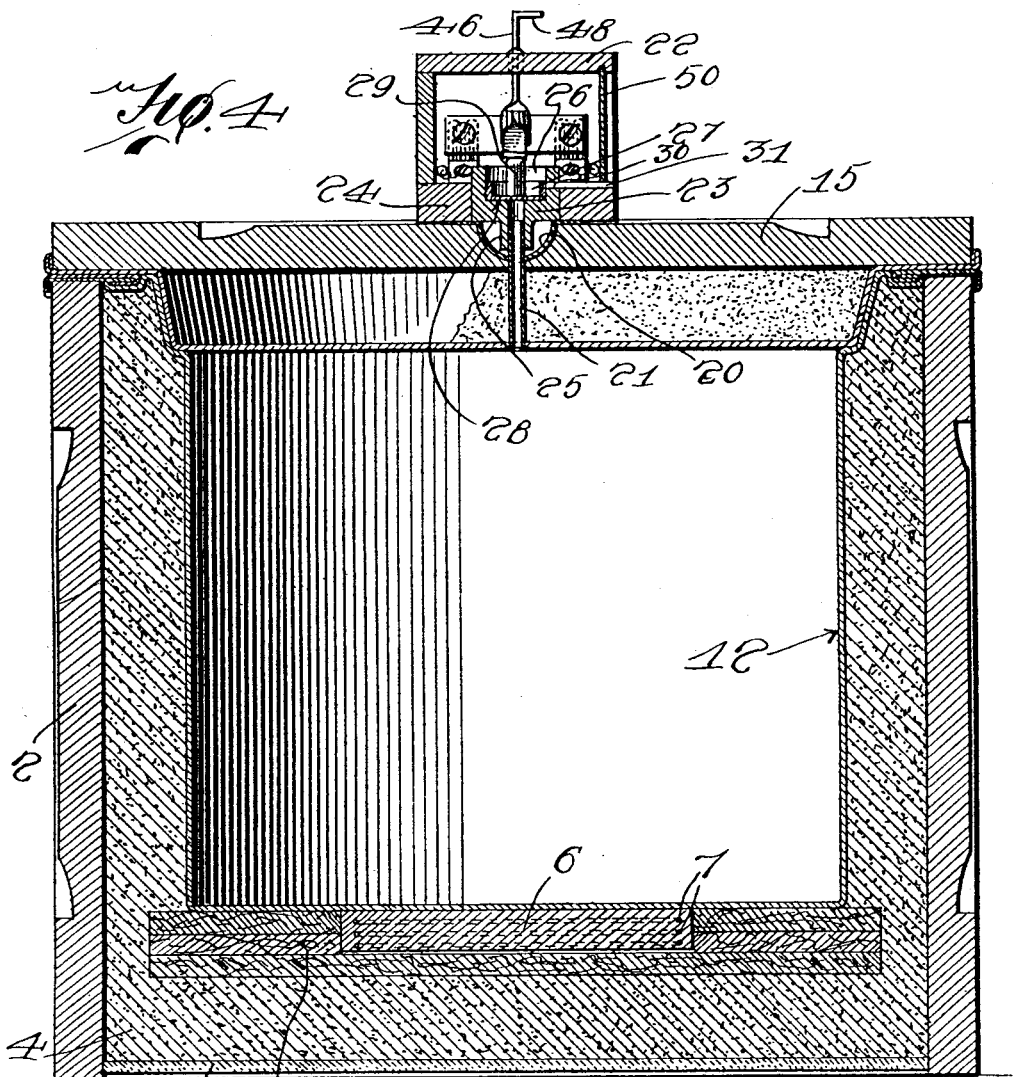
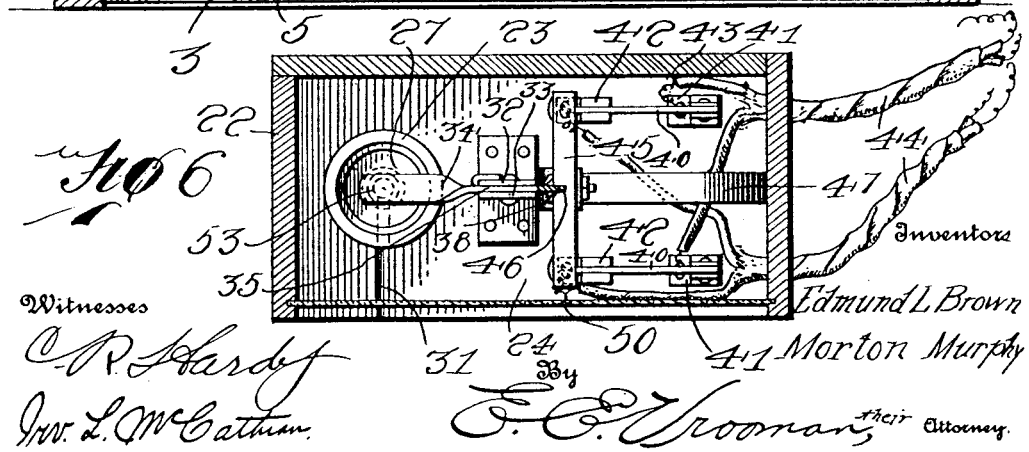
Witnesses
C. R. Hardy
Jno. L. McCathian
Inventors
Edmund L. Brown
Morton Murphy
By E. E. Vrooman, their Attorney.
THE NORRIS PETERS CO., PHOTO-LITHO., WASHINGTON, D. C.

UNITED STATES PATENT OFFICE.

EDMUND L. BROWN AND MORTON MURPHY, OF JANESVILLE, WISCONSIN, ASSIGNORS TO THE CALORIC COMPANY, OF JANESVILLE, WISCONSIN.

FIRELESS COOK-STOVE OR COOKER.

1,110,184.    Specification of Letters Patent.    Patented Sept. 8, 1914.

Application filed July 26, 1913. Serial No. 781,373.

*To all whom it may concern:*

Be it known that we, EDMUND L. BROWN and MORTON MURPHY, citizens of the United States, residing at Janesville, in the county of Rock and State of Wisconsin, have invented certain new and useful Improvements in Fireless Cook-Stoves or Cookers, of which the following is a specification, reference being had therein to the accompanying drawing.

This invention relates to automatic cut-offs for fireless cookstoves or cookers and the like wherein the electric current may be automatically cut off from the cooker as soon as the desired heat or steam has been obtained therein.

Another object of the invention is the production of a simple and efficient cut-off which may be detached from the cooker when not in use after sufficient heat or steam has been generated therein.

With the above and other objects in view this invention consists of certain novel combinations, constructions and arrangements of parts as will be hereinafter fully described and claimed.

In the accompanying drawings:—Figure 1 is a perspective view of the cooker in actual operation. Fig. 2 is a top plan view of the cooker, showing the cut-off in position. Fig. 3 is a vertical section through the cooker and cut-off casing showing the cut-off mechanism in side elevation. Fig. 4 is a section taken on line 4—4, of Fig. 3. Fig. 5 is an enlarged longitudinal section through the cut-off casing showing the cut-off mechanism in section. Fig. 6 is a central horizontal section through the shut-off casing and shut-off rod or handle taken on line 6—6, of Fig. 5. Fig. 7 is a longitudinal section of the shut-off casing showing the switch in an open position. Fig. 8 is an enlarged transverse section through the heat inlet cap carried by the cut-off casing showing the manner in which the steam or heat may escape after the valve has been thrown to an open position and the switch has been automatically cut off. Fig. 9 is a detail perspective of the tripping rod of the cut-off mechanism for the switch.

By referring to the drawings it will be seen that 1 designates the cooker proper which is formed of an outer casing 2 having a plastic or composition bottom plate 3. A filler or heat insulating material 4 is placed within the cooker 1 and a plurality of asbestos stone or other suitable heating blocks 5 are placed in the bottom of the cooker and carry centrally thereof the heating coil carrying block 6 within which block is wound a plurality of heating coils 7. Of course, it should be understood that the coils may be placed in any desired manner within the block 6. A protector plate 8 is carried by one side of the cooker and is placed in front of the contact plug 9, which plug is preferably formed of porcelain or other suitable insulating material, and forms a contact between the contact plug 10 and the contacting wires 11, which wires 11 pass and are connected to the heat generating block 6. It, of course, should be understood that the heat insulating material 4 is formed of nonconductive material.

A seamless aluminum well 12 is placed within the insulating material 4 and this well is provided at the top thereof with an interlocking joint 13 for supporting the well 12 in engagement with the metallic plate 14 carried by the top of the cooker. A cover 15 is hingedly secured to the cooker 1 by means of the hinges 16, and this cover carries a depending casing 17, formed upon the under face of the cover 15. A shoulder or ledge portion 18 is formed near the top of the seamless aluminum well 12 to constitute a side seat for the depending casing 17.

The cover 15 is provided with a concave socket 19 upon the upper face thereof in which is placed a metallic basin 20. A tube 21 is carried by this basin 20 and communicates with the interior of the seamless aluminum well by passing through the depending casing 17 as is illustrated in Figs. 3 and 4. The upper end of the tube 21 projects above the lower edge of the basin 20 in the manner as illustrated in Fig. 4, for allowing a valve to fit over the projecting end and normally close the passage through the tube 21 when the ordinary heat is retained within the seamless aluminum well 12. It is not necessary to illustrate the valve as placed upon the tube 21, in view of the fact that this valve is foreign to the construction or merits of the present invention defined by the appending claims.

A circuit breaking casing 22 is detachably mounted upon the cover 15 and this casing 22 carries a metallic cup shape valve seat 23 which valve seat 23 is positioned within the base 24 formed of stone, plastic or any other suitable material. The valve seat 23 is provided with a depending stem 25 which stem fits snugly over the upwardly projecting end of the stem 21 for firmly holding the circuit breaking casing 22 upon the cover of the fireless cooker or cookstove. This valve seat 23 is provided with a socket portion 26 in which socket portion is slidably placed a sliding valve 27 of a cup shape structure. This valve 27 fits snugly in engagement with the side walls of the socket 26 so as to normally prevent the escape of steam through the valve seat 23. The cup 27 normally rests upon the bottom 28 of the seat 23 and carries a projecting knob 29 which knob may be formed of rubber or any other suitable material. The valve seat 23 is provided with an aperture 30 in one side thereof, which aperture 30 communicates with a channel 31 formed upon the upper face of the base plate 24 of the casing 22. This channel will allow the escapement of steam or heated air from the casing 22 when the valve 27 is raised above the aperture 30 in the valve seat 23 by means of the steam or heated air which may be generated within the seamless aluminum well 12.

A bracket 32 is mounted upon the base plate 24 and this bracket 32 comprises a pair of vertically extending plates 33 between which plates is mounted the tripper arm 34. This tripper arm 34 is provided with a body portion 35 and carries at its forward end a laterally extending finger 36 which finger is adapted to limit the swinging movement of the trigger 34 in one direction. The body portion 35 of the trigger 34 terminates at its rear end in an abrupt shoulder 37, which shoulder is adapted to engage the projecting lip 38 of the bracket 39 carried by the switch 40. This switch 40 is pivotally mounted upon the standards 41 which standards are carried by the base plate 24. A plurality of contact members 42 are also supported upon the base plate 24 and the switch 40 is adapted to close the circuit between the contact members 41 and 42. The several lead wires 43 of the electrical supply wires 44 are connected to the standards or contact posts 41 and 42 in the manner illustrated in Fig. 6 so as to cause the circuit to be broken by bringing the switch 40 into and out of contact with the contact members 42. An insulating connecting block 45 passes transversely across the switch 40 and an operating lever or handle 46 is connected thereto for the purpose of allowing the switch to be manually set.

A flat spring 47 is fixedly secured to the base plate 24 and passes under the bracket 39 so as to normally exert an upward pressure upon the switch and force the same to an open position as soon as the trigger 34 has been moved out of engagement with the projection 38 of the bracket 39. The lever or operating arm 46 is provided with a laterally extending tongue 48 and the lever 46 works in a longitudinally extending slot 49 formed in the casing 22. One side of the casing 22 is provided with a glass 50 to allow the operator to see that the switch is in proper contact. A screw 51 is carried by the top of the casing 22 so as to limit the upward swing of the trigger 34.

The trigger 34 is provided with a downwardly extending leg portion 52 which terminates in a projecting foot 53, the foot 53 being adapted to normally rest upon the knob 29. As the steam or heat is generated to a sufficient amount within the well of the fireless cooker the steam will force the valve 27 upwardly and push the trigger 34 upwardly thereby releasing the shoulder 37 from the projection 38 and the spring 47 will thereby force the switch upwardly and throw the same out of engagement with the members 42 thereby cut off the flow of current through the heating coils 7 formed in the heating block 8.

From the foregoing description it will be seen that an efficient means has been produced for automatically cutting off the current from an electrically heated fireless cookstove as soon as sufficient heat has been generated therein so as to prevent the usual waste of heat and at the same time prevent the burning of the material which is in the cooker, or cookstove. It, of course, should be understood that if the automatic cut-off may be so manufactured as to accommodate different circumstances such as the desiring of heating certain articles to a greater temperature than others by regulating the weight of the valve 27, for it should be understood that the time at which the valve will open will be greatly controlled by the weight of the valve itself and by increasing and decreasing the weight of the valve 27 it will be obvious that the heat to be generated within the cookstove may be adjusted to accommodate the different temperatures desired. It should be further borne in mind that the invention may be modified as to its detail mechanical construction without departing from the spirit of the invention.

From the foregoing description it will be seen that a positive and automatic circuit breaker has been produced for use in connection with fireless cookers, whereby the current will be automatically cut off at the proper time, for it is necessary that a cut-off be so constructed in connection with fireless cookers that the same may be only operated when the temperature rises to a predetermined point for it is a well known fact that the larger the quantity of foods that are cooking the greater length of time is required.

As is illustrated in Figs. 1 and 6 the heating block 6 is connected in series with the switch 40 by having the main conducting wire 54 passing into the casing 22 and being connected to the respective posts or contact members 41 and the auxiliary wire 55 is connected to the other posts 42 and then is connected to the plug 10 for supplying the desired current to the heating block 6.

Having thus described the invention what is claimed as new, is:—

1. In a fireless cooker or cookstove the combination with a cooking compartment, a tube projecting therefrom, of a circuit breaking casing provided with a valve seat having a depending neck fitting over the upper end of said tube, a vertical slidable valve carried within said valve seat, said valve seat provided with a transversely extending discharge aperture, said casing provided with a base having a channel formed therein and communicating with said transversely extending aperture for permitting the discharge of steam from said casing when said vertical slidable valve is moved upwardly, a switch, electrical heating means carried within said compartment, means for supplying an electric current through said switch to said heating means, and a trigger normally holding said switch in a closed position and adapted to release said switch as said vertical slidable valve is moved upwardly.

2. A circuit breaker comprising a casing provided with a transparent side, a base, said base provided with a valve seat having a depending neck adapted to fit over a tube, a vertical slidable valve positioned within said valve seat and carrying a resilient knob, said valve seat provided with a transversely extending aperture, said base provided with a transversely extending channel communicating with said aperture, a switch pivotally mounted within said casing, an operating handle carried by said switch for facilitating the manual operation thereof, a spring normally exerting an upward pressure upon said switch and adapted to force the same to an inoperative position, a trigger pivotally mounted within said casing and provided with an abrupt shoulder portion, said switch provided with a bracket having a projecting end, said projecting end adapted to fit under said abrupt shoulder, a laterally extending finger carried by said trigger and adapted to limit the swing of said trigger in one direction, a projecting foot carried by said trigger and engaging said resilient knob whereby said trigger will be swung upwardly as said valve is moved upwardly for automatically releasing said switch at a predetermined point.

In testimony whereof we hereunto affix our signatures in presence of two witnesses.

EDMUND L. BROWN.
MORTON MURPHY.

Witnesses:
J. R. WHIFFEN,
H. A. MOESER.

---

Copies of this patent may be obtained for five cents each, by addressing the "Commissioner of Patents, Washington, D. C."